United States Patent [19]

Packer

[11] 4,214,067
[45] Jul. 22, 1980

[54] SEALING COMPOSITION

[75] Inventor: Marvin Packer, Broomall, Pa.

[73] Assignee: RCA Corporation, New York, N.Y.

[21] Appl. No.: 860,561

[22] Filed: Dec. 14, 1977

[51] Int. Cl.² .............................................. C08G 59/66
[52] U.S. Cl. ...................................... 528/93; 525/523; 525/535; 528/109
[58] Field of Search ................ 260/830 S; 528/93, 99, 528/109

[56] References Cited

U.S. PATENT DOCUMENTS

| | | | |
|---|---|---|---|
| 2,789,958 | 4/1957 | Fettes et al. | 260/42 |
| 2,955,327 | 10/1960 | Beardslee et al. | 18/59 |
| 3,536,656 | 10/1970 | Sommer | 260/37 |

OTHER PUBLICATIONS

Lee et al., *Handbook of Epoxy Resins*, N.Y. McGraw-Hill, 1967, pp. 9-4, 9-5, 16-21, 22, 23, 24, 25.

*Primary Examiner*—Earl A. Nielsen
*Attorney, Agent, or Firm*—Birgit E. Morris; A. Stephen Zavell

[57] ABSTRACT

A cured epoxy resin composition containing high concentrations of liquid polysulfide polymers has improved resistance to thermal cycling and degradation by moisture.

7 Claims, 1 Drawing Figure

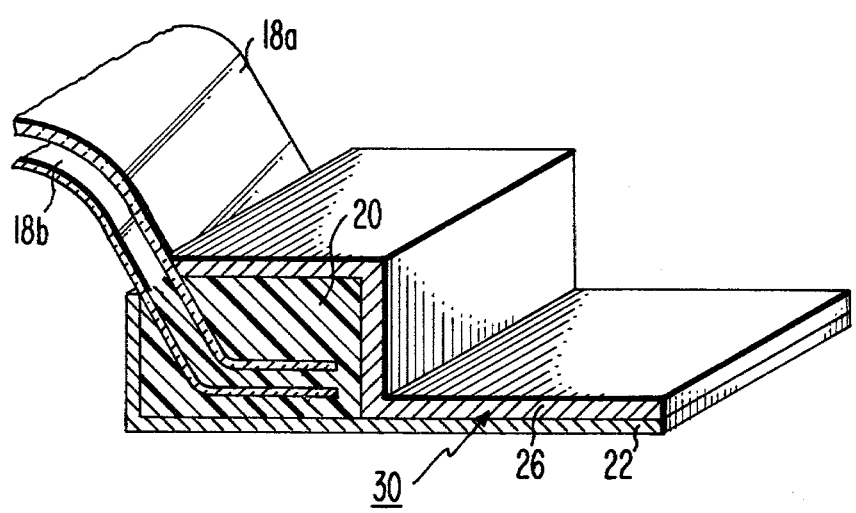

SEALING COMPOSITION

This invention relates to a novel sealing composition. More particularly, this invention relates to a sealing composition having improved resistance to thermal cycling and degradation by moisture.

BACKGROUND OF THE INVENTION

Skylights or domes are often added to buildings or other structures as a source of illumination or for aesthetic purposes. To give the structure thermal insulating properties, the skylights or domes are often constructed in two parts with a layer of dead air space between the inner and outer parts. The domes are usually constructed out of plastics such as acrylic plastics, and, more specifically, polymethyl methacrylate. Present techniques of installing skylights or domes usually involve the mounting of the skylight or dome in a frame made from aluminum or other suitable materials and thereafter applying a sealant, i.e., sealing composition. In addition, the labor intensive and time consuming job of priming the domes prior to sealing is often required to prevent loss of adhesion. Priming is the application of an initial adhesive coating to a surface to increase its receptivity to the main adhesive or coating.

The widely varying temperatures and moisture content of the atmosphere to which the skylights are normally exposed causes the primer or sealant to fail. This results in condensation within the dead air space between the two parts of the dome or skylight, causing a cloudy appearance, or even permitting water to leak into the interior of the building or structure. Known epoxy resins can pot dome structures. However, the resins tend to be too brittle without additives, such as flexibilizers, to withstand the humidity and temperature variations of outside weather conditions.

Although mixtures of epoxy resins and polysulfide resins are known, the art has not recognized either that the resultant resins have improved adhesion retention with respect to moisture resistance or resistance to thermal cycling. Further, the art does not teach the relative proportions of such compositions needed to impart such properties.

SUMMARY OF THE INVENTION

The sealing composition embodying the invention comprises about 100 to about 120 parts by weight of a diglycidyl ether of bisphenol A mixed with about 125 to about 180 parts by weight of a liquid polysulfide polymer and from about 10 to about 12 parts by weight of a conventional epoxy curing agent. Regardless of the diglycidyl ether of bisphenol A concentration, the liquid polysulfide polymer concentration must be about 1.25 times that concentration. The curing agent should be present in a concentration sufficient to cure the composition.

These sealing compositions are low in material cost, require minimal labor to seal components, and maintain good adhesion between the frame and the skylight or dome without losing sealing properties under wide variations of moisture content and temperature of the ambient atmosphere.

BRIEF DESCRIPTION OF THE DRAWING

The FIGURE is a perspective cross-sectional view of a double dome structure sealed with the composition of the invention.

DETAILED DESCRIPTION OF THE INVENTION

Epoxy resins have been in widespread use for many years and are excellent adhesives for both metallic and non-metallic surfaces. With modifications, epoxy resins can be adapted for use as sealants in the potting of skylights and domes. One type of epoxy resin is prepared by reacting epichlorohydrin with polyhydroxy compounds such as bisphenol A in the presence of an alkaline catalyst to form the diglycidyl ether of bisphenol A. The basic formula of these epoxy resins is given below:

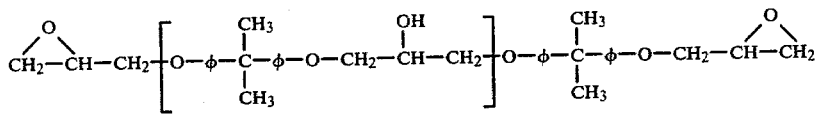

The epoxy resin is crosslinked through the hydroxy and epoxy groups.

The choice of curing agent does have an effect on the final properties and also on the curing rate, which can generally be accelerated by an increase in temperature. Typical crosslinking agents are, for example, amines, anhydrides, aldehyde condensation products and Lewis acids. When room temperature curing is desired, aliphatic amines are useful curing agents. Suitable curing agents include diethylene triamine, triethylenetetramine 2,4,6-tri (dimethylaminomethyl)phenol and the like. The curing agent is present in an amount sufficient to cure the composition, for example, about 10 to about 12% of the diglycidyl ether of bisphenol A. Epoxy resins can also contain a variety of fillers, additives, accelerators, deodorants, and colorants as is well known.

In order to enhance the properties of a cured epoxy resin in sealing compositions useful to pot various metals and plastics and to improve the resistance of the cured epoxy resin to the effects of moisture and thermal cycling, a liquid polysulfide polymer is added prior to curing. The liquid polysulfide polymer is added in an amount that is aboubt 1.25 times the diglycidyl ether of bisphenol A concentration.

For example, about 125-150, preferably about 130-140 and most preferably about 135 parts of liquid polysulfide polymer to about 100 parts by weight of a diglycidyl ether of bisphenol A will be employed. If the diglycidyl ether of bisphenol A is 120 parts by weight, a preferred concentration of liquid polysulfide polymer is about 165 parts by weight with about 12 parts by weight of the curing agent.

Suitable liquid polysulfide polymers should be insoluble in water, kerosene, cyclohexanol, methanol, ethanol, ethylglycol, and glycerol; have an average molecular weight of about 800–1200 and preferably 1000; have an average mercaptan content of about 6–7% and preferably about 6.6% and specific gravity at 25° C. of about 1.00 to about 1.50; preferably about 1.25 to about 1.30 and most preferably about 1.27; and have an average viscosity of between about 10 to about 15, and preferably about 12, poises at 25° C.

The polysulfide liquid polymers copolymerize with epoxy resins primarily by an addition reaction between the mercaptan terminals of the liquid polymer and the epoxide groups. The general reaction may be represented as follows:

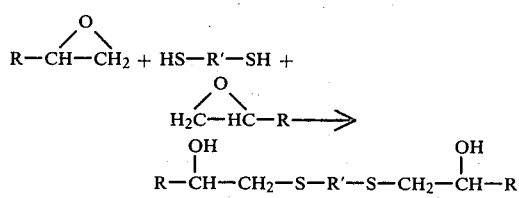

wherein R is aliphatic, aromatic, alkyl, or alkyl-aromatic and R' is aromatic, alkyl and preferably aliphatic.

The liquid polysulfide can be conveniently added to the desired epoxy or to a mixture formed by combining the epoxy resin and the curing agent solution in the usual manner. The cured sealing composition exhibits little shrinkage with ageing.

In order to test the resistance of the sealing composition to the thermal and moisture cycling of outdoor weather conditions, sections of acrylic plastics such as polymethyl methacrylate and aluminum were cut from skylight assemblies for testing. My invention is not limited to these materials. For example, the frame material may be polyvinyl chloride plastics (PVC). In addition, other commonly used frame materials and plastics or glass can be potted with the sealing composition of my invention.

The acrylic plastic and aluminum sections were wiped with a solvent and inserted into an aluminum foil dish containing the sealing compositions and allowed to cure at room temperature. After the sealing composition had partially hardened, the aluminum dish was stripped away and the composition was allowed to cure at least about 72 hours prior to being cut in half. A minimum of about 7 days of curing was allowed before the thermal cycling and water immersion tests were carried out as explained below:

The cured potting sealant holding the acrylic plastic and aluminum sections were subjected to 24 hours immersion in water followed by 12 cycles of thermal cycling from about −40° C. to about 60° C. with an hour hold at each temperature extreme. After the thermal cycling, the potted members were immersed in water until there was a sign of loss of sealing.

The loss of sealing was tested by hand twisting or pulling the potted members to determine if the sealing composition exhibited a failure to adhere to the potted members. The twisting or pulling was performed after the initial water immersion, the thermal cycling, and the reimmersion in water.

The most promising sealing composition, on the basis of retention of adhesion and sealing characteristics during exposure to water and thermal cycling, was selected for potting a production pair of acrylic plastic domes in aluminum frames.

The FIGURE illustrates a production double dome and frame. The double dome 18a and 18b are inserted between a base frame member 22 and the top frame member 26. The members 22 and 26 form a potting receptacle 30 for the domes 18a and 18b. Sufficient sealing composition 20 is poured around and between the double domes 18a and 18b to fill the potting receptacle 30. After potting the domes 18a and 18b in receptacle 30 the composition is allowed to cure.

The invention will be further illustrated by the following examples but the invention is not meant to be limited to the details described therein. In the examples, all parts are by weight.

EXAMPLES 1-9

Examples 1–9 comprise compositions containing various amounts of the epoxy resin Epon 828 of the Shell Oil Company, a diglycidyl ether of bisphenol A; Thiokol LP3 of the Thiokol Corp., a liquid polysulfide polymer; and EH-330 or DMP 30 (trademark products of the Thiokol Corporation or Rohm & Haas respectively), a curing agent having the structure 2,4,6-tri (dimethylaminomethyl)phenol.

Examples 6–9 contain in addition about 2.5 parts by weight of various types of silanes. The silanes were products of the Dow Corning Corp. Example 6 contained an N-β-aminoethyl-γ-aminopropyl trimethoxy silane; Example 7 contained a γ-methylacryloxypropyl-trimethoxysilane of the formula:

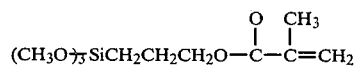

Example 8 contained glycidoxy-propyl trimethoxy silane and Example 9 contained mercaptopropyltrimethoxysilane of the formula:

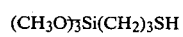

The compositions are summarized below in Table I.

TABLE I

| Components of | EXAMPLES, PARTS BY WEIGHT | | | | | | | | |
| the composition | 1 | 2 | 3 | 4 | 5 | 6 | 7 | 8 | 9 |
|---|---|---|---|---|---|---|---|---|---|
| Epoxy Resin | 100 | 120 | 120 | 120 | 120 | 120 | 100 | 120 | 120 |
| Polysulfide | 150 | 180 | 180 | 180 | 180 | 180 | 125 | 165 | 180 |
| Curing Agent | 10.0 | 12.0 | 12.0 | 12.0 | 12.0 | 12.0 | 10.0 | 12.0 | 12.0 |

EXAMPLES 10-12

In Table II, Examples 10–12 are summarized. These compositions are similar to those of Examples 1–9 of Table I, but they contain an epoxy resin ratio to liquid polysulfide polymer ratio of 1:1. In addition, Examples 11 and 12 contain about 30 drops and about 60 drops respectively of an adhesive, Aron Alpha Cyanoacrylate, and Sealant 271, respectively.

All the compositions according to Examples 1–9 and Examples 10–12 passed the initial water immersion for 24 hours and the 12 cycles of thermal cycling from about −40° C. to about 60° C. Upon reimmersion in water, Examples 10–12, containing a liquid polysulfide concentration of less than about 1.25 times the epoxy resin concentration, failed to seal the potted members over a period of about 24-48 hours. The data are summarized in Table II below:

TABLE II

| Components of the composition | EXAMPLES, PARTS BY WEIGHT | | |
|---|---|---|---|
| | 10 | 11 | 12 |
| Epoxy Resin | 100 | 100 | 100 |
| Polysulfide | 100 | 100 | 100 |
| Curing Agent | 8.0 | 10.0 | 8.0 |

Examples 10 and 11 lost adhesive power with respect to the potted aluminum frame member while Example 12 failed to adhere to the potted acrylic plastic member. Examples 1-9, containing liquid polysulfide concentrations, greater than about 1.25 times the epoxy resin concentration, adhered to both the aluminum and acrylic plastic members.

Compositions according to Example 8 were used to pot full scale acrylic plastic domes in aluminum frames. Two compositions were tested for tensile strength measured in psi at about 25° C. After 48 hours exposure to 98% RH, 57° C., the composition according to Example 8, containing a higher concentration of polysulfide polymer, had a tensile strength of 128 psi and about 43% elongation, while the composition according to Example 7 had a tensile strength greater than 173 psi and an elongation of only about 40%.

These tests indicate that although a minimum concentration of polysulfide polymer of about 1.25 times the concentration of the epoxy resin is necessary to provide an adequate sealing composition, the higher the concentration of liquid polysulfide polymer the more sensitive the sealing composition becomes to softening by water and/or heat. For practical reasons, the liquid polysulfide concentration is not in excess of about 1.5 times the concentration of the diglycidyl ether of bisphenol A.

COMPARATIVE EXAMPLES A-N

Examples A-J (Table III) and Examples K-N (Table IV) illustrate other compositions which were tested in an effort to discover a suitable sealing composition. All these compositions were ineffective in sealing and potting polymethyl methacrylate and aluminum members.

In the Tables, "U" is a modified amine curing agent commercially available from the Shell Oil Company.

CE modified "U" is a composition according to application Ser. No. 784,453, filed Apr. 4, 1977.

Versamid 140 is a polyamide resin product of the General Mills Co.

A1120 is a silane composition available from the Union Carbide Co.

TETA, triethylenetetramine, is a catalyst for the epoxy resin.

ATBN is an amine-terminated polybutadiene acrylonitrile liquid polymer with a Brookfield Viscosity of 200,000 cps at 27° C., an equivalent weight of between 1750-1800, a specific gravity of 0.96 and contains 16-18% acrylonitrile.

EM 308 is a combination flexibilizer and curing accelerator available from the Thiokol Corporation, NC513 is a reactive epoxy flexibilizer with a viscosity of 50 cps at 25° C. and an epoxide equivalent number of 490. It is available from the Cardolite Company.

CB2793 is an epoxy resin, a product of the Ciba-Geigy Co., based on the hydantoin nitrogen-containing heterocyclic ring. It is water soluble and has a viscosity of about 1500-2500 ccps at 25° C. XU205 is an amine catalyst also available from the Ciba-Geigy Co.

TABLE III

| Components of the composition | EXAMPLES | | | | | | | | | |
|---|---|---|---|---|---|---|---|---|---|---|
| | A | B | C | D | E | F | G | H | I | J |
| Epon 828 | 100 | 100 | 100 | | 100 | 100 | 100 | 100 | 150 | 100 |
| Thiokol | | | 60 | | | | | | | |
| Versamid 140 | 250 | 350 | | | 150 | | 220 | | | |
| CE Modified "U" | | | 35.0 | | | | | | | |
| A1120 | | | | | 12.0 | | | | | |
| EM308 | | | | | | | 100 | | 100 | 150 |
| ATBN | | | | | | 25.0 | 40 | 40 | | |
| XB2793 | | | | 100 | | | | | | |
| NC513 | | | | | | | | | | 33.0 |
| TETA | | | | | | | | | | 13.0 |
| U | | | | | 15.0 | | | | | |
| XU205 | | | | | 21.0 | | | | | |

TABLE IV

| Components of the composition | EXAMPLES | | | |
|---|---|---|---|---|
| | K | L | M | N |
| Epon 828 | 150 | 150 | 150 | 150 |
| EM308 | 150 | 150 | 150 | 150 |
| Z6020 | 2.5 | | | |
| Z6039 | | 2.5 | | |
| Z6040 | | | 2.5 | |
| Z6062 | | | | 2.5 |

All the compositions of Examples A-J and K-N passed the initial water immersion and thermal cycling tests with the exception of Example B. Example B passed the initial water immersion but failed to pass the thermal cycling segment of the testing procedure, due to excess flow of the composition.

With the exception of Example A, which failed to adhere to both the aluminum and acrylic plastic upon reimmersion in water, Examples C and E-N failed to adhere to and seal the potted aluminum member.

Example D was made from Ciba-Geigy's epoxy 2793 and said Company's amine catalyst XU-205 and the amine catalyst U of the Shell Oil Company. The resultant sealing composition of Example D was too brittle and its testing was discontinued.

Further, a comparison of Examples 3-6 of Table I and K-N of Table IV shows that the addition of silane has no effect on the adhesion of the sealing composition. The ratio of the epoxy resin to liquid polysulfide polymer is critical in order to create a sealing composition which is able to pot both metal and acrylic plastics.

I claim:

1. A composition for sealing acrylic plastics in frames which is resistant to adhesion failure induced by thermal and moisture variations of ambient weather consisting of a diglycidyl ether of bisphenol A, a liquid polysulfide polymer in a concentration of from at least about 1.25 to about 1.8 times the diglycidyl ether of bisphenol A concentration and a curing agent in an amount sufficient to cure the composition.

2. A composition according to claim 1 wherein the liquid polysulfide polymer is a mercaptan terminated long chain aliphatic polymer containing disulfide linkages with an average molecular weight of about 800 to about 1200 and a mercaptan content of about 6.0% to about 7.0% by weight an average viscosity of about 10 to about 15 poises at 25° C. and an average specific gravity of about 1.00 to about 1.50 at 25° C.

3. A composition according to claim 2 wherein the curing agent is 2,4,6-tri (dimethylaminomethyl)phenol.

4. A composition according to claim 1 wherein said composition is about 100 to about 120 parts by weight of said diglycidyl ether of bisphenol A, about 125 to about 180 parts by weight of said liquid polysulfide polymer, and about 10 to about 12 parts by weight of said curing agent.

5. A composition according to claim 4 wherein the liquid polysulfide polymer is a mercaptan terminated long chain aliphatic polymer containing disulfide linkages with an average molecular weight of about 800 to about 1200 and a mercaptan content of about 6.0 to about 7.0% by weight and an average viscosity of about 10 to about 15 poises at 25° C. and an average specific gravity of about 1.00 to about 1.50 at 25° C.

6. A composition according to claim 5 wherein the curing agent is 2,4,6-tri (dimethylaminomethyl)phenol.

7. A composition according to claim 6 wherein said composition is about 120 parts by weight of said diglycidyl ether of bisphenol A, about 165 parts by weight of said liquid polysulfide polymer, and about 12 parts by weight of said curing agent.

* * * * *